United States Patent [19]

Baron

[11] Patent Number: 5,326,070
[45] Date of Patent: Jul. 5, 1994

[54] SOLENOID VALVE

[75] Inventor: Tibor Baron, Dixon, Ill.

[73] Assignee: Borg-Warner Automotive, Inc., Sterling Heights, Mich.

[21] Appl. No.: 66,956

[22] Filed: May 24, 1993

[51] Int. Cl.⁵ .............................................. F16K 31/06
[52] U.S. Cl. ........................... 251/129.15; 251/129.05
[58] Field of Search ....................... 251/129.15, 129.05

[56] References Cited

U.S. PATENT DOCUMENTS

| | | |
|---|---|---|
| 3,510,814 | 5/1970 | Nordfors ............... 251/129.15 X |
| 3,670,768 | 6/1972 | Griswold ............... 251/129.15 X |
| 4,099,701 | 7/1978 | Berger . |
| 4,556,085 | 12/1985 | Warrick . |
| 4,570,904 | 2/1986 | Mullally . |
| 4,595,035 | 6/1986 | Warrick . |
| 4,617,968 | 10/1986 | Hendrixon . |
| 4,674,536 | 6/1987 | Warrick . |
| 4,753,263 | 6/1988 | Warrick . |
| 4,765,587 | 8/1988 | Cummins . |
| 4,863,142 | 9/1989 | Hendrixon et al. . |
| 4,869,461 | 9/1989 | Perry ............................. 251/129.15 |
| 4,893,645 | 1/1990 | Augustinas et al. . |
| 5,174,262 | 12/1992 | Staerzl ........................ 251/129.15 X |

Primary Examiner—Arnold Rosenthal
Attorney, Agent, or Firm—Harness, Dickey & Pierce

[57] ABSTRACT

A solenoid valve has an elastomeric annular disc placed between the stationary and the moveable armatures. The elastomeric disc operates to absorb axially transmitted loads to quiet the operation of the solenoid valve. The solenoid valve also includes a pair of elastomeric rings surrounding the movable armature and being located between the lower armature and the coil assembly of the solenoid valve. The elastomeric rings operate to absorb laterally transmitted loads to quiet the operation of the solenoid valve. In another embodiment of the invention, the elastomeric rings are replaced with longitudinally extending elastomeric ridges located between the movable armature and the coil assembly. In this second embodiment, the elastomeric ridges may be integral with the elastomeric disc.

11 Claims, 3 Drawing Sheets

SOLENOID VALVE

FIELD OF THE INVENTION

The present invention relates to solenoid valves. More particularly, the present invention relates to solenoid valves which have an elastomeric cushion between the movable armature and the coil assembly which absorbs lateral energy which in turn quiets the operation of the solenoid valve.

BACKGROUND AND SUMMARY OF THE INVENTION

The automotive industry has been and continues to go through the evolution of their internal combustion engines in order to have the emissions from these engines lower in hydrocarbons, carbon monoxide and NOx. One source of hydrocarbon emissions has been from the unused fuel within the fuel tank, the carburetor and throughout the fuel delivery system. In order to reduce these emissions, charcoal canisters have been incorporated which absorb the hydrocarbon emissions from the fuel system when the engine is not running. Once the engine is started, the charcoal canister is purged of the absorbed hydrocarbons by virtue of attachment of the charcoal canister to the intake vacuum of the engine which pulls air through the charcoal canister and into the combustion process.

The amount of air which is used to purge the charcoal canisters must be controlled to a specific volume in order for the engine to operate efficiently and be tuned to limit the other types of pollutants. Normally, the regulation of the volume of air flowing through the charcoal canister is controlled by a pulse width modulated solenoid valve and a regulator. The regulator is used to maintain the level of vacuum pressure which is connected to the charcoal canister. Normally the level of this vacuum pressure is maintained at approximately 5 inches of mercury. The solenoid valve is then operated in a pulse width modulated mode to control the amount of fluid allowed to flow through the system at the vacuum pressure level controlled by the regulator. Because the solenoid valve is being operated continuously in a pulse width modulated mode, the noise generated by the solenoid valve must be kept to a minimum in order to provide for the comfort and convenience of the occupants of the vehicle.

Prior art solenoid valves have proved to be excessively noisy for positioning them within the fuel system to meter the flow of air from the charcoal canister. The movable armature has a tendency for side slapping the coil assembly due to the inherent variation in the magnetic flux caused by the tolerances present in the internal components of the prior art solenoid valves. In addition, noise may be generated by the contact between the upper and lower armature if the magnetic flux is strong enough to overcome the amount of force exerted by the coil spring which separates the two armatures.

The present invention provides the art with a solenoid valve which incorporates an elastomeric bushing between the upper and lower armature to dampen any axial motion or contact between the two armatures. In addition, an elastomeric cushion is provided between the movable armature and the coil assembly to cushion any tendency for the moveable armature to slap against the coil assembly. The elastomeric cushion can be a plurality of elastomeric rings surrounding the movable armature or the elastomeric cushion can be a plurality of longitudinally disposed elastomeric strips running the length of the movable armature.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

The solenoid valve of the present invention is shown for exemplary purposes incorporated into a fluid flow control system for the control of emissions of an internal combustion engine. While not to be limited to this automotive application, the solenoid valve of the present invention can be utilized in virtually any application where the noise associated with the operation of the solenoid valve is considered to be objectionable.

Figure 1:
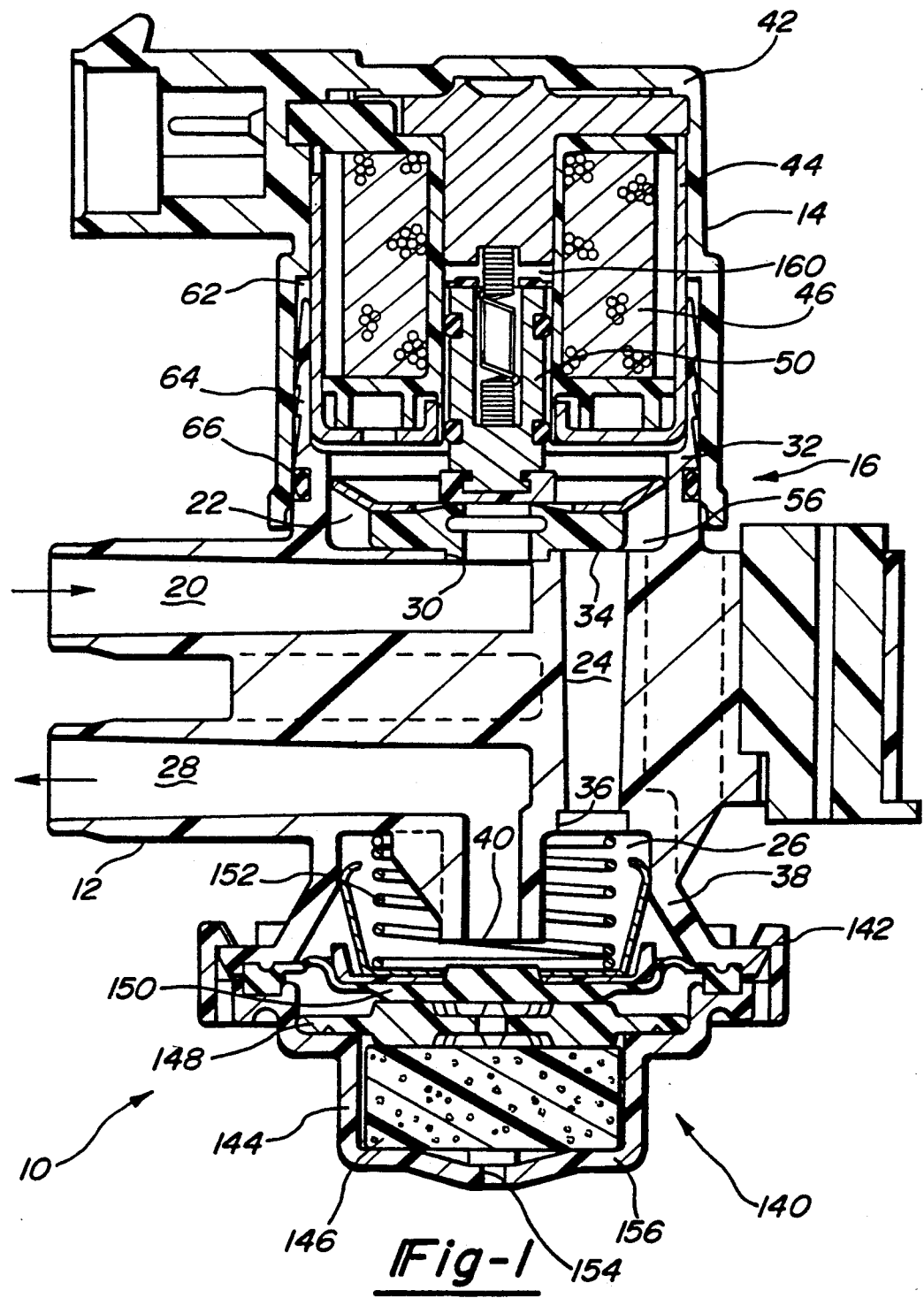
FIG. 1 is a longitudinal cross section of a fluid flow control system incorporating a solenoid valve in accordance with the present invention.

Referring now to the drawings in which like reference numerals designate like or corresponding parts throughout the several views, there is shown in FIG. 1 a fluid flow valve 10 in accordance with the present invention. Fluid valve 10 comprises a housing 12, a solenoid valve 14 and a valve 16.

Housing 12 defines an inlet passageway 20, a first fluid chamber 22, an intermediate passageway 24, a second fluid chamber 26 and an outlet passageway 28. Inlet passageway 20 extends into housing 12 and is in communication with first fluid chamber 22 through opening 30. First fluid chamber 22 is formed by a cylindrical wall 32 extending from housing 12 and is in communication with inlet passageway 24 through opening 34. Intermediate passageway 24 extends between first fluid chamber 22 and second fluid chamber 26. Intermediate passageway 24 is in communication with first fluid chamber 22 through opening 34 and second fluid chamber 26 through opening 36. Second fluid chamber 26 is formed by a cylindrical wall 38 extending from housing 12 and is in communication with intermediate passageway 24 through opening 36 and outlet passageway 28 through opening 40. Outlet passageway 28 extends from opening 40 through housing 12. Thus, housing 12 defines a flow path through housing 12 beginning at inlet passageway 20 continuing through opening 30 into first fluid chamber 22. From first fluid chamber 22, the flow path continues through opening 34 into intermediate passageway 24 and into second fluid chamber 26 through opening 36. From second fluid chamber 26, the flow path continues through opening 40 and into outlet passageway 28 and finally out of housing 12.

Figure 2:
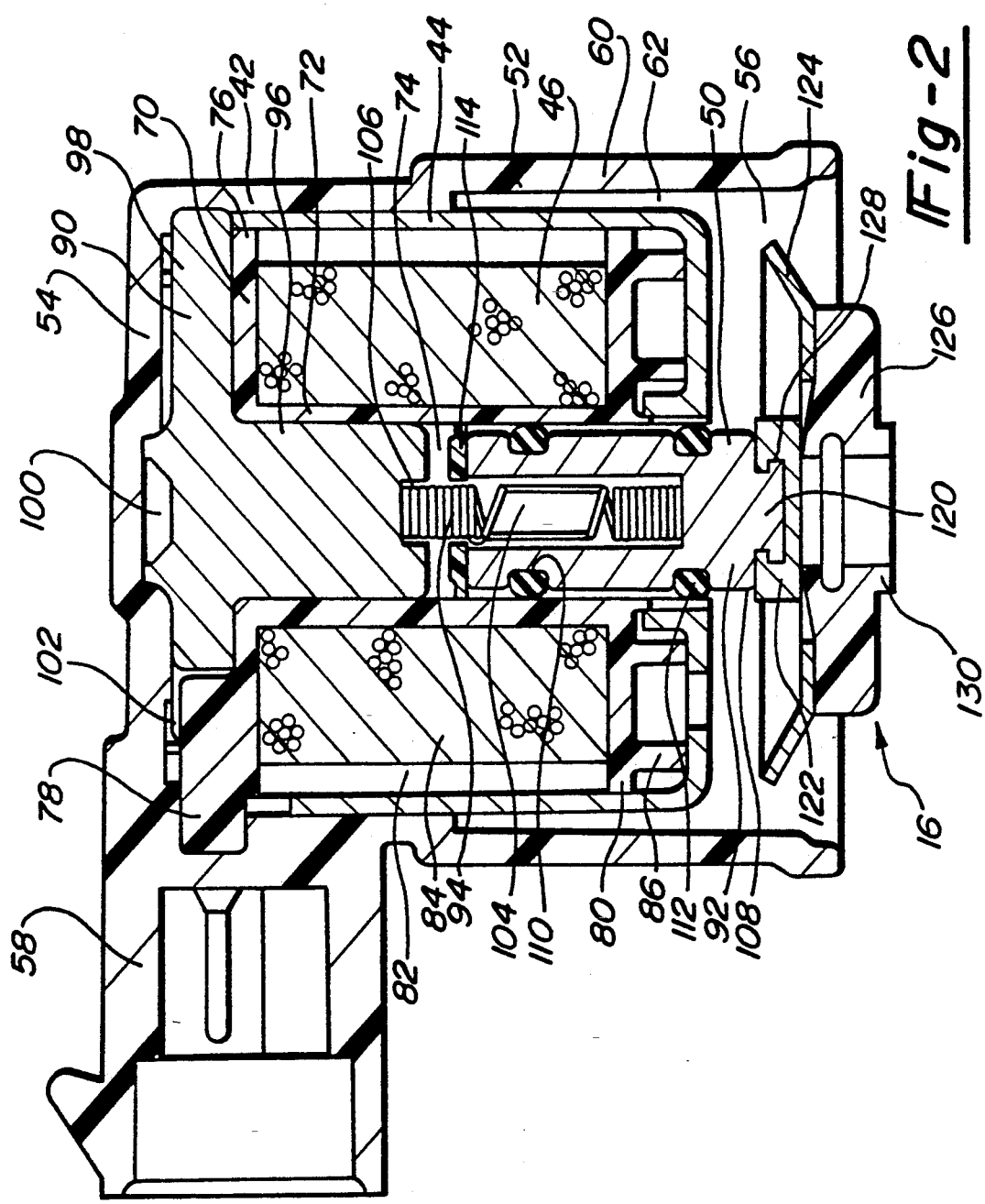
FIG. 2 is an enlarged cross section view of the solenoid valve shown in FIG. 1.

Solenoid valve 14 engages cylindrical wall 32 which forms first fluid chamber 22 and is operative to selectively close or open opening 30 which connects inlet passageway 20 with first fluid chamber 22 thereby permitting or interrupting the flow path through housing 12. Solenoid valve 14, as best shown in FIG. 2, comprises a body 42, a cover 44, a coil assembly 46, and an armature 50.

Body 42 is a generally hollow cup shaped member having a cylindrical shaped wall 52 and a bottom wall 54 located at one end thereof. Cylindrical wall 52 and bottom wall 54 define a generally cylindrical cavity 56. Extending radially outward from cylindrical wall 52 and bottom wall 54 is an annular member 58. Annular member 58 is adapted to receive an electrical connector (not shown) which provides power to energize coil assembly 46 as will be described later herein. Disposed within cavity 56 is cover 44. Cover 44 engages a portion of cylindrical wall 52 and together with a stepped portion 60 of cylindrical wall 52 forms annular cavity 62. Cylindrical wall 32 of housing 12 is adapted to secure solenoid valve 14 to housing 12. The exterior surface of cylindrical wall 32 can be threaded to threadingly engage a corresponding thread on the interior of stepped portion 60 of cylindrical wall 52 or the exterior surface of cylindrical wall 32 can be provided with a plurality of teeth 64 to engage stepped portion 60 of cylindrical wall 52 as shown in FIG. 1. Once solenoid valve 14 is assembled to housing 12, cylindrical wall 32 is located in annular cavity 62 formed by body 42 and cover 44. An appropriate seal 66 is provided to seal cylindrical cavity 56 from this outside environment.

Coil assembly 46 is located within cover 44 and includes a bobbin 70 which has a cylindrical wall 72 defining an internal cavity 74 extending through it. Extending radially outward from one end of cylindrical wall 72 is an annular wall 76. Annular wall 76 has a radially extending arm 78 which engages annular member 58 of body 42 to provide for the electrical connection and access to coil assembly 46. A second annular wall 80 located at the opposite end of bobbin 70 from annular wall 76 also extends radially outward from cylindrical wall 72. Annular wall 76, cylindrical wall 72, annular wall 80 and cover 44 of body 42 define a second annular cavity 82. Second annular cavity 82 receives an annular coil 84. Annular coil 84 is electrically coupled to annular member 58 of body 42 through arm 78. A plurality of legs 86 extend axially from second annular wall 72 as shown in FIG. 2 for locating coil assembly 46 within body 42.

Armature 50 is a three piece assembly comprising an upper armature 90, a lower armature 92 and a biasing spring 94. Upper armature 90 includes a cylindrical section 96 having an annular section 98 extending radially from one end thereof. Cylindrical section 96 extends into a circular cavity 100 formed into body 42 for locating upper armature 90 radially and axially within coil assembly 46. Annular section 98 mates with annular wall 76 of bobbin 70 to position upper armature 90 axially with respect to coil assembly 46. A cutout section 102 is formed into annular section 98 to accommodate arm 78 of bobbin 70. Thus, upper armature 90 is located within coil assembly 46 by the engagement of annular section 98 with bobbin 70 and with the engagement of cylindrical section 96 with body 42.

Lower armature 92 is a cylindrical shaped member having a cylindrical cavity 104 extending axially into it. Cylindrical cavity 104 is utilized to position biasing spring 94. Spring 94 is a coil spring located within cavity 104 and extends into a cylindrical cavity 106 located in upper armature 90. Cavity 106 is similar in diameter to cavity 104 but as shown in FIG. 2, cavity 106 is shallower in depth. The depth of cavities 104 and 106 can be varied as long as the total depth of the two cavities does not exceed the working length of spring 94. Spring 94 bears against upper armature 90 and biases lower armature 92 away from upper 90. The exterior surface 108 of lower armature 92 defines a pair of annular cavities 110. Disposed within each annular cavity 110 is an elastomer strip 112 which is employed to absorb lateral mechanical impact energy. This absorption of lateral mechanical impact energy works to reduce the excessive transmitted acoustic energy (noise) produced by solenoid valve 14. An elastomer annular cushion 114 is located between upper armature 90 and lower armature 92 to absorb axial mechanical impact energy. This works to reduce the excessive transmitted acoustic energy (noise) produced by solenoid valve 14. Located on the end of cylindrical shaped armature 92 opposite to cylindrical cavity 104 is an axially extending hat section 120. Hat section 120 securely attaches valve 16 to lower armature 92 for axial movement therewith.

Valve 16 is comprised of an attachment cylinder 122, an annular ring 124 and a valve seat 126. Attachment cylinder 122 is preferably made from Viton but can be made from other materials if desired. Cylinder 122 defines an internal cavity 128 which is similar in configuration to hat section 120. Hat section 120 is mated with internal cavity 128 to secure valve 16 to hat section 120 for axial movement therewith. The attachment of hat section 120 with attachment cylinder 122 provides for a limited amount of angular movement between the two pieces to accommodate any misalignment between the two pieces. Secured by bonding to the end of attachment cylinder 122 opposite to internal cavity 128 is annular ring 124. Annular ring 124 is preferably made from stainless steel and operates to stiffen and guide valve 16 within cylindrical cavity 56 of body 42 during axial movement. Secured by bonding to the face of annular ring 124 opposite to attachment cylinder 122 is valve seat 126. Valve seat 126 is an annular elastomeric member preferably made from Viton which has a second annular member 130 extending from the side of valve seat 126 opposite to annular ring 124. Second annular member 130 is adapted to be received within opening 30 for sealing engagement therewith under the force exerted by biasing spring 94. Valve seat 126 is stiffened by annular ring 124 to enhance the sealing between valve seat 126 and opening 30.

A regulator 140 is fixedly secured to cylindrical wall 38 of housing 12 by a plurality of retaining clips 142. Regulator 140 comprises a body 144, a filter 146, a guide 148, a valve seat 150 and an operating spring 152. Body 144 encloses second fluid chamber 26 and defines a vent hole 154 extending through an outside wall 156 of body 144. Disposed between outside wall 156 and opening 40 in housing 12 is filter 146, guide 148 and valve seat 150. Operating spring 152 biases valve seat 150 away from opening 40 and towards outside wall 156 of body 144. The purpose of regulator 140 is to maintain a relatively consistent vacuum pressure throughout housing 12. When manifold vacuum is connected to passageway 28, regulator 140 operates to maintain and stabilize the vacuum within housing 12 to approximately 5 inches of mercury.

The assembly of solenoid valve 14 begins with the assembly of coil 84 within annular cavity 82. Lead wires from coil 84 are positioned within radially extending arm 78 to mate with annular member 58 to provide for electrical connection to coil 84. Upper armature 90 is then positioned within internal cavity 74 of bobbin 70 and cover 44 is placed over bobbin 70. This entire assembly is then located in a molding machine and is molded in position within body 42 of solenoid valve 14. Biasing spring 94 is located within lower armature 92, valve 16 is attached to hat section 120 of lower armature 92 and this assembly is located within internal cavity 74 of bobbin 70. This completes the assembly of solenoid valve 14 which is then mated with housing 12 by engaging cylindrical wall 32 of housing 12 with annular cavity 62 formed by cover 44 and stepped portion 60 of cylindrical wall 52. Once assembled to housing 12, solenoid valve 14 is operative to open and close opening 30 by the application and release of power to solenoid valve 14. The interior of solenoid valve 14 is sealed from the outside environment by seal 66.

An air gap 160 located between upper armature 90 and lower armature 92 allows for limited axial movement of lower armature 92. When power is supplied to coil assembly 46, a magnetic flux is created. This flux can be best visualized by reference to FIG. 2. Magnetic flux induced by coil 84 will follow a path through lower armature 92, through second annular wall 80 of coil assembly 46, through cover 44, through first annular wall 76 of coil assembly 46, through upper armature 90, across the air gap 160 between upper armature 90 and lower armature 92 and back into lower armature 92.

Once assembled into a motor vehicle in either a pulse width modulated capacity or in an on/off capacity, solenoid valve 14 is normally closed. This is caused by lower armature 92 forcing valve 16 against the wall of body 12 defining opening 30 by the force of coil spring 94. When power is supplied to coil 84, lower armature 92 is attracted towards upper armature 90. This allows fluid to flow from passageway 20, through opening 30 into cavity 22, through opening 34 into passageway 24 and through opening 36 into cavity 26. regulator 140, when open, allows the fluid to continue to flow through opening 40 into passageway 28 which is connected to the intake manifold vacuum. As described above, regulator 140 maintains and stabilizes the vacuum within housing 12 to approximately 5 inches of mercury. When power is terminated, coil spring 94 urges lower armature 92 and valve 16 against the portion of body 12 defining opening 30 closing the valve.

Figure 3:
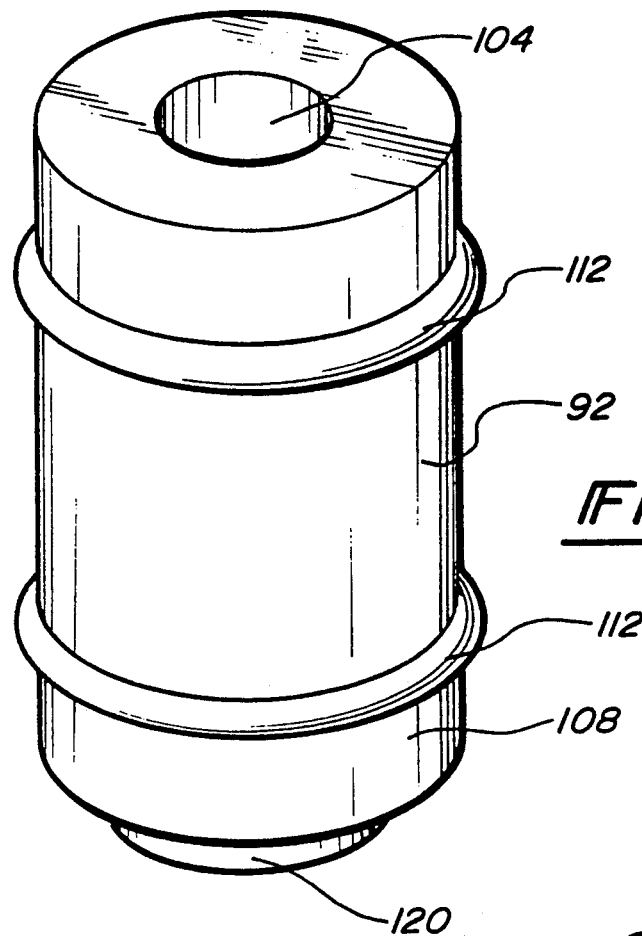
FIG. 3 is a perspective view of the movable armature of the solenoid valve shown in FIG. 1.
Figure 4:
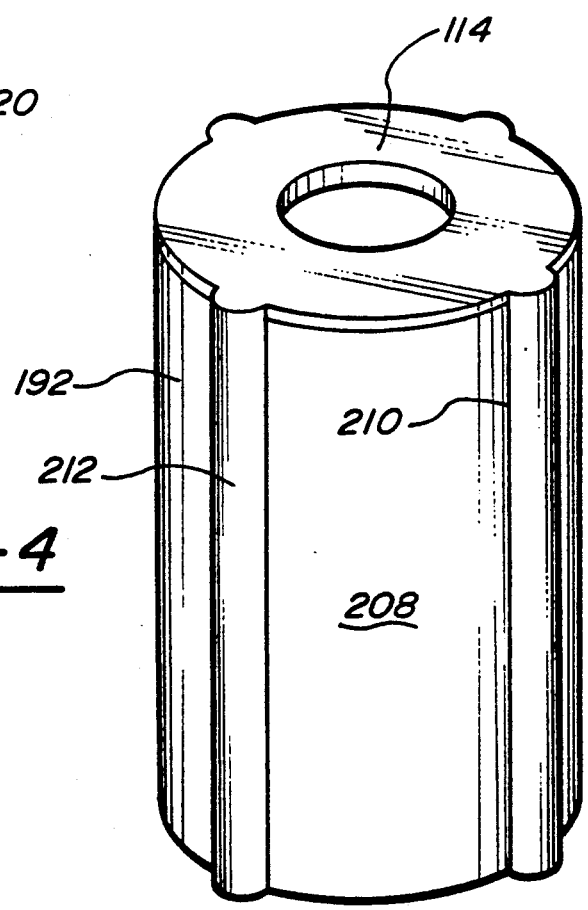
FIG. 4 is a perspective view of the movable armature according to another embodiment of the present invention.

Referring now to FIG. 4, another embodiment of the elastomeric cushion shown in FIGS. 1 through 3. FIG. 4 shows a lower armature 192 having an exterior surface 208 which defines a plurality of longitudinally extending cavities 210 (four in the preferred embodiment). Disposed within each longitudinal cavity 210 is an elastomeric strip 212 which is employed to absorb lateral mechanical impact energy. Similar to the embodiment described in FIGS. 1 through 3, this absorption of lateral mechanical impact energy works to reduce the excessive transmitted acoustic energy (noise) produced by solenoid valve 14. Elastomeric annular cushion 114 located between upper armature 90 and lower armature 92 to absorb axial mechanical impact energy may be manufactured integral with elastomeric strips 212 if desired as shown in FIG. 4.

While the above detailed description describes the preferred embodiment of the present invention, it should be understood that the present invention is susceptible to modification, variation and alteration without deviating from the scope and fair meaning of the subjoined claims.

What is claimed is:

1. A solenoid valve comprising:
   a cylindrical body having an outside wall defining an internal cavity, said body having a radially inwardly extending end wall disposed at one end thereof;
   an end cap fixedly secured to the opposite end of said body, said end cap having a through bore;
   an upper armature disposed within said internal cavity of said body;
   a lower armature disposed within said internal cavity between said upper armature and said end cap, said upper and lower armatures defining an annular space between said upper and lower armatures and said body;
   a valve seat fixedly secured to said lower armature and adapted to mate with said through bore in said end cap;
   biasing means disposed between said upper and lower armatures, said biasing means urging said valve seat into engagement with said through bore in said end cap;
   a coil assembly disposed within said annular space such that when fluid is applied to said through bore and said coil assembly is de-energized, said biasing means holds said valve seat against said through bore and prevents flow through said through bore, and when said coil assembly is energized, said valve seat and said lower armature are drawn toward said upper armature to permit flow through said through bore;
   first cushioning means for reducing noise, said first cushioning means disposed between said upper and lower armatures; and
   second cushioning means for reducing noise, said second cushioning means disposed between said lower armature and said coil assembly.

2. The solenoid valve of claim 1 wherein said first cushioning means is an elastomeric annular disc.

3. The solenoid valve of claim 2 wherein said elastomeric annular disk is made from Viton.

4. The solenoid valve of claim 1 wherein said second cushioning means is a plurality of annular rings disposed between said lower armature and said coil assembly.

5. The solenoid valve of claim 4 wherein said plurality of annular rings are equal to two.

6. The solenoid valve of claim 4 wherein said plurality of annular rings are made from Viton.

7. The solenoid valve of claim 1 wherein said second cushioning means is a plurality of longitudinally extending elastomeric ridges disposed between said lower armature and said coil assembly, 8. The solenoid valve of claim 7 wherein said plurality of longitudinally extending elastomeric ridges are equal to four.

9. The solenoid valve of claim 7 wherein said plurality of longitudinally extending elastomeric ridges are made from Viton.

10. The solenoid valve of claim 7 wherein said first cushioning means is an elastomeric annular disc integral with said plurality of longitudinally extending elastomeric ridges.

11. The solenoid valve of claim 1 wherein said biasing means includes a coil spring disposed within a pocket in said lower armature.

* * * * *